(12) United States Patent
Dearing et al.

(10) Patent No.: US 8,435,435 B2
(45) Date of Patent: May 7, 2013

(54) METHOD OF MAKING A MULTILAYERED DUPLEX MATERIAL ARTICLE

(75) Inventors: Daniel Dearing, Plymouth, MI (US);
Eric Holmes, Ann Arbor, MI (US);
Markus Fischer, Northville, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 585 days.

(21) Appl. No.: 12/295,416

(22) PCT Filed: Mar. 30, 2007

(86) PCT No.: PCT/US2007/065618
§ 371 (c)(1),
(2), (4) Date: Dec. 9, 2010

(87) PCT Pub. No.: WO2007/115155
PCT Pub. Date: Oct. 11, 2007

(65) Prior Publication Data
US 2011/0095451 A1    Apr. 28, 2011

Related U.S. Application Data

(60) Provisional application No. 60/787,419, filed on Mar. 30, 2006.

(51) Int. Cl.
*B29C 45/14* (2006.01)
*B29C 39/10* (2006.01)

(52) U.S. Cl.
USPC ........................................... 264/275; 264/274

(58) Field of Classification Search .................. None
See application file for complete search history.

(56) References Cited

U.S. PATENT DOCUMENTS

| | | | | |
|---|---|---|---|---|
| 2,479,039 A | * | 8/1949 | Cronstedt | 416/204 R |
| 3,342,564 A | * | 9/1967 | Schwartz et al. | 428/663 |
| 3,701,377 A | | 10/1972 | Fisher et al. | |
| 3,701,378 A | | 10/1972 | Graham et al. | |
| 3,922,044 A | | 11/1975 | Bucalo | |
| 4,337,817 A | * | 7/1982 | Komatsu et al. | 164/120 |
| 4,850,802 A | * | 7/1989 | Pankratz et al. | 416/213 R |
| 4,965,035 A | | 10/1990 | Ishiwatari et al. | |
| 5,029,459 A | * | 7/1991 | Almblad | 70/395 |
| 5,108,699 A | * | 4/1992 | Bodnar et al. | 420/109 |
| 5,193,607 A | * | 3/1993 | Demukai et al. | 164/493 |
| 5,431,752 A | * | 7/1995 | Brogle et al. | 148/516 |
| 5,842,265 A | | 12/1998 | Rink et al. | |
| 6,007,301 A | * | 12/1999 | Noda et al. | 416/213 R |
| 6,427,755 B1 | | 8/2002 | Buckley | |

(Continued)

FOREIGN PATENT DOCUMENTS

| | | |
|---|---|---|
| EP | 0721831 | 7/1996 |
| JP | 54013588 | 2/1979 |

(Continued)

*Primary Examiner* — Edmund H. Lee
(74) *Attorney, Agent, or Firm* — Norris McLaughlin & Marcus, P.A.; Christa Hildebrand

(57) ABSTRACT

Disclosed is a method for manufacturing a multilayered duplex material article. The method comprises providing a first layer from a non-cast material and a second layer from a cast material wherein the second layer is made from a material with a lower melting point than the first layer. In one embodiment the first layer is a wrought alloy and the second layer is cast onto the first layer.

18 Claims, 3 Drawing Sheets

U.S. PATENT DOCUMENTS

| | | |
|---|---|---|
| 6,544,357 B1 | 4/2003 | Hehmann et al. |
| 6,564,856 B1 | 5/2003 | Buckley |
| 6,705,848 B2 | 3/2004 | Scancarello |
| 2003/0008134 A1 | 1/2003 | Murar et al. |
| 2004/0009072 A1* | 1/2004 | Baur et al. ................ 416/244 A |
| 2004/0062943 A1 | 4/2004 | Naritomi et al. |

FOREIGN PATENT DOCUMENTS

| | | | |
|---|---|---|---|
| JP | 57188656 | * | 11/1982 |
| JP | 58217679 | | 12/1983 |
| JP | 05070969 | | 3/1993 |
| JP | 2001225352 | | 8/2001 |
| JP | 2001298277 | | 10/2001 |
| JP | 2002361725 | | 12/2002 |
| JP | 2003103563 | | 4/2003 |
| JP | 2003170531 | | 6/2003 |
| JP | 2003246009 | | 9/2003 |
| JP | 2004050488 | | 2/2004 |

* cited by examiner

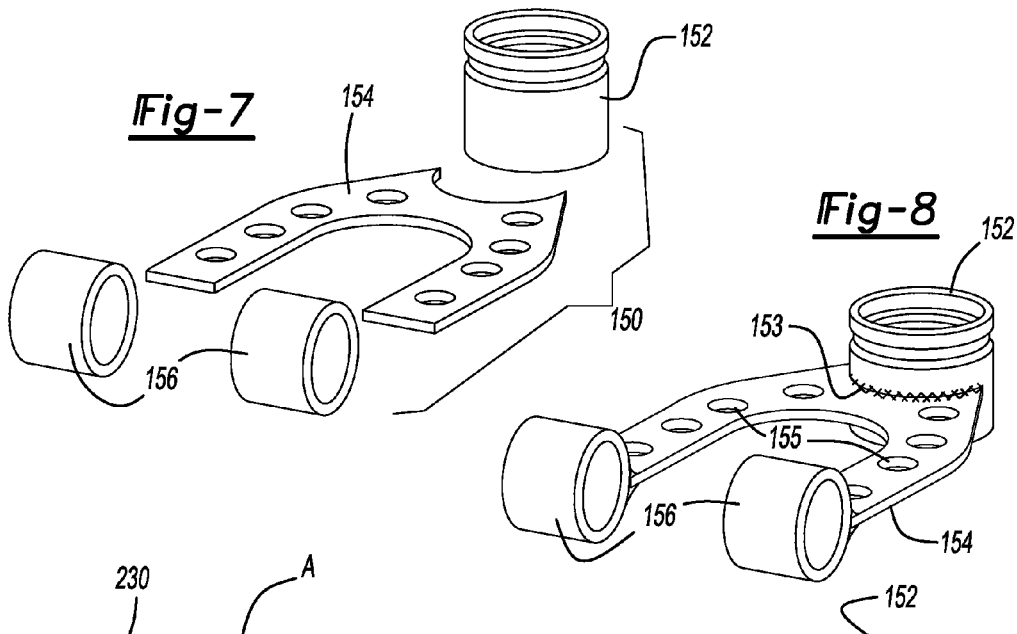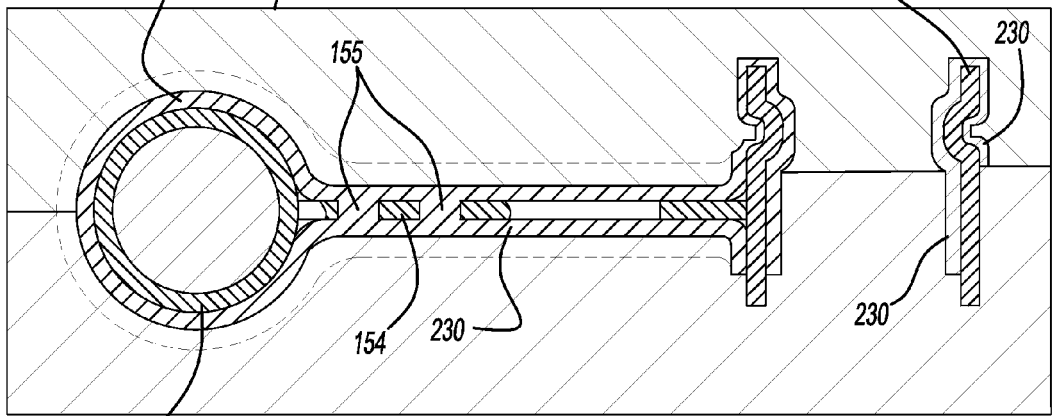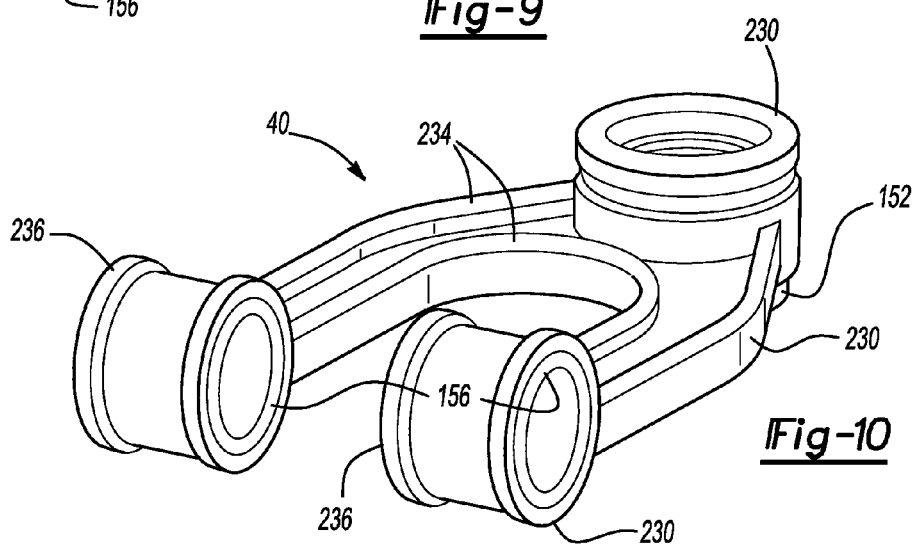

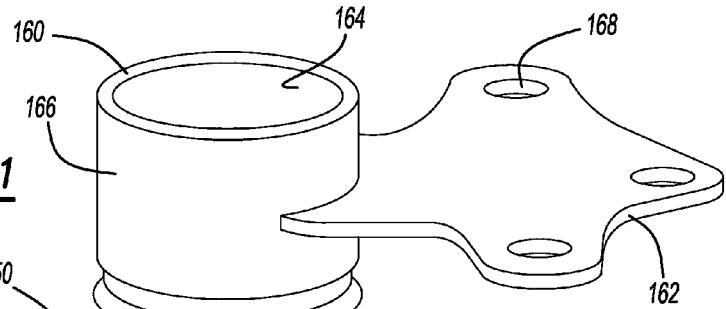
*Fig-11*
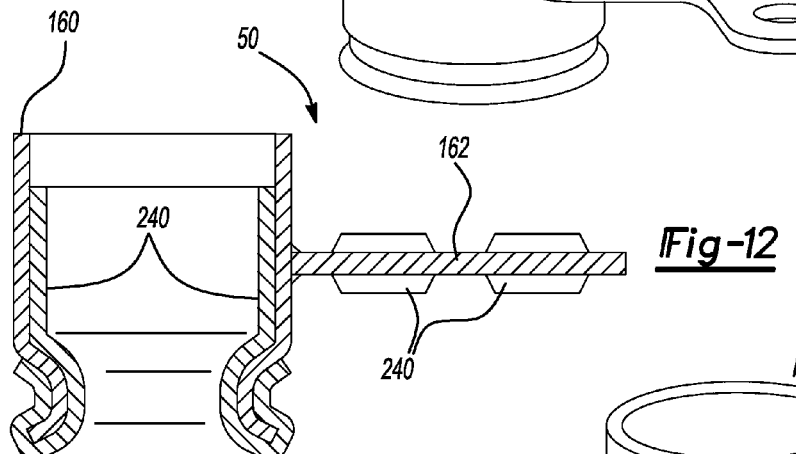
*Fig-12*
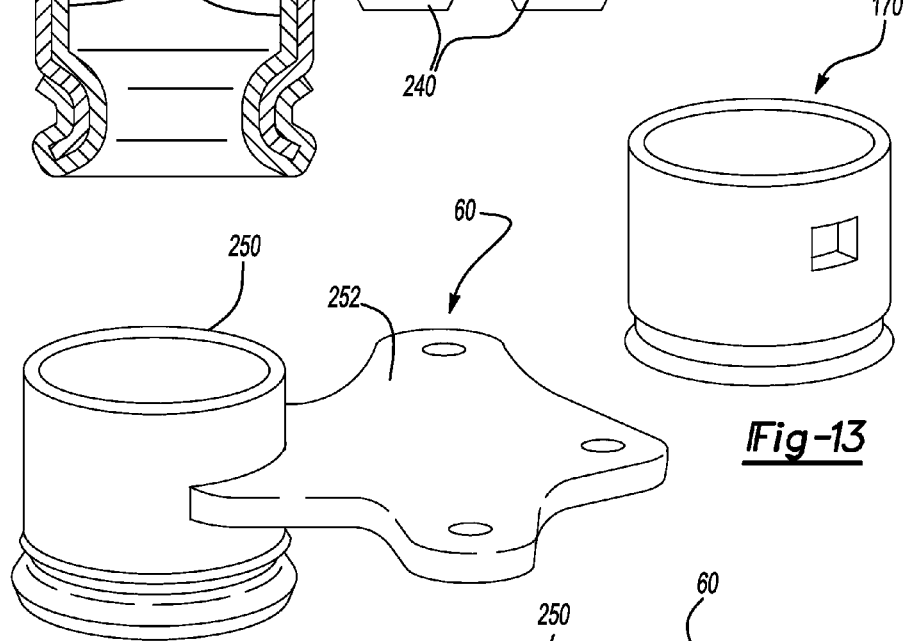
*Fig-13*
*Fig-14*
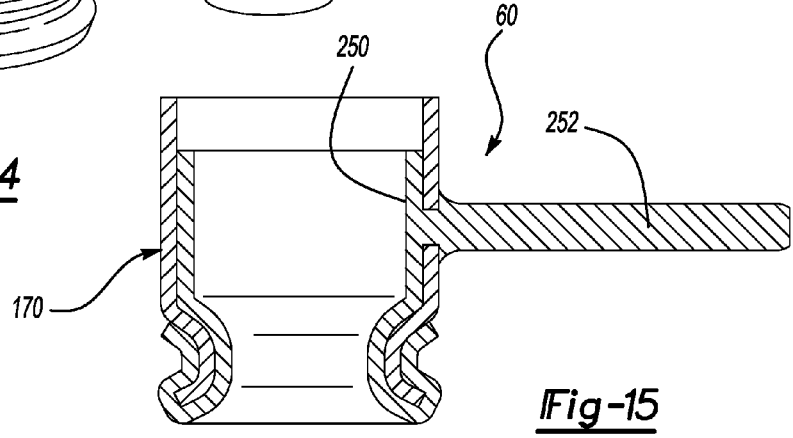
*Fig-15*

METHOD OF MAKING A MULTILAYERED DUPLEX MATERIAL ARTICLE

CROSS REFERENCE TO RELATED APPLICATIONS

This application is the U.S. national phase of PCT/US2007/065618 filed Mar. 30, 2007, which claims priority of U.S. Provisional Patent Application Ser. No. 60/787,419, filed on Mar. 30, 2006, both of which are incorporated herein by reference.

FIELD OF THE INVENTION

This invention relates generally to a method of manufacturing an article. More specifically, the invention relates to a method for manufacturing a multilayered duplex material article wherein at least one layer is cast.

BACKGROUND OF THE INVENTION

Components and/or articles made from metals, plastics, ceramics, etc., can be manufactured using a variety of industrial processes. For example, components made from wrought alloys can be fabricated or produced using hot rolling, cold rolling, stamping, spinning, drawing, piercing and the like. In contrast, the pouring of molten metal into a cavity can produce a cast material article. Typically, cast articles have properties distinct from articles manufactured from wrought materials and depending upon desired design and/or performance requirements, an engineer/designer can select the material the article is to be made from and which process to use in making it.

The use of more than one material to manufacture an article can be desirable if distinct properties, or a combination of properties, are needed and/or would be useful within the article. However, the manufacture of an article made from dissimilar materials can be complicated and expensive. For example, the different properties of two materials used to produce a single article can lead to forming, welding and/or machining difficulties. As such, there is a need for a method to produce multilayered duplex material components.

SUMMARY OF THE INVENTION

Disclosed is a method for manufacturing a multilayered duplex material article. The method includes providing a first layer from a non-cast material and a second layer from a cast material wherein the second layer includes a material with a lower melting point than the first layer. In one embodiment, the first layer is a wrought alloy and the second layer is cast onto the first layer. The first layer can be formed by wrought alloy forming processes such as stamping, drawing, rolling, spin forming and the like.

In another embodiment, the first layer is made from steel and can include apertures therein which aid in the bonding of the second layer to the first layer. The second layer has at least one physical, chemical and/or mechanical property that is greater than 20% different than the first layer. The second layer can provide a spacer, a socket and/or other functional component to the article. In addition, the second layer can provide a surface with an improved surface finish compared to the first layer and/or a surface that provides improved bonding with a third layer. The second layer can also provide a material with improved weldability and/or machinability properties when compared with the first layer.

BRIEF DESCRIPTION OF THE DRAWINGS

FIG. 7 is an exploded perspective view of an example unassembled first layer used in an embodiment of the method of the present invention;

FIG. 8 is a perspective view of an example assembled first layer used in an embodiment of the method of the present invention;

FIG. 9 is a cross-sectional view of an article in a die cast mold produced using an embodiment of the method of the present invention;

FIG. 10 is a perspective view of an article produced using an embodiment of the method of the present invention;

FIG. 11 is an example first layer used in the method of the present invention;

FIG. 12 is a cross-sectional view of an article produced using an embodiment of the method of the present invention;

FIG. 13 is an example first layer used in an embodiment of the method of the present invention;

FIG. 14 is a perspective view of an article produced using an embodiment of the method of the present invention; and FIG. 15 is a cross-sectional view of an article produced using an embodiment of the method of the present invention.

DETAILED DESCRIPTION OF THE PREFERRED EMBODIMENTS

The present invention comprises a method to produce a multilayered duplex material article. As such, the present invention has utility as a method for producing articles which can exhibit properties and characteristics, and/or a combination of properties and characteristics, of different materials. The method of the present invention is a manufacturing process wherein a first layer, also known as a skeleton layer, is made from a non-cast material such as a wrought alloy or sintered ceramic. Once the first layer has been formed into a desired shape, a second layer is cast onto and/or throughout the first layer. In this manner, a single article is provided which can have properties derived from the non-cast layer and the second cast layer.

Figure 1:
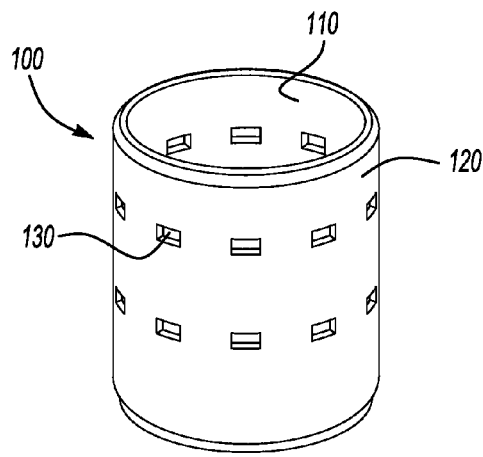
FIG. 1 is a perspective view of an example first layer used in an embodiment of the method of the present invention.

Referring now to FIG. 1, there is shown an example of a first layer 100 used in the method of the present invention. The first layer 100 has a first surface 110 and a second surface 120. Optionally, the first layer 100 can have at least one aperture 130 adjoining the first surface 110 and the second surface 120. In one embodiment, the first layer 100 is made from a wrought alloy such as steel, stainless steel, nickel-base alloys, cobalt-base alloys and/or other metallic materials. For the purposes of the present invention, a wrought alloy is defined as an alloy that has been mechanically, thermally and/or thermal-mechanically processed such that recrystallization of the material has occurred. In the alternative, the first layer 100 can be manufactured from a ceramic and/or refractory material.

Figure 2:
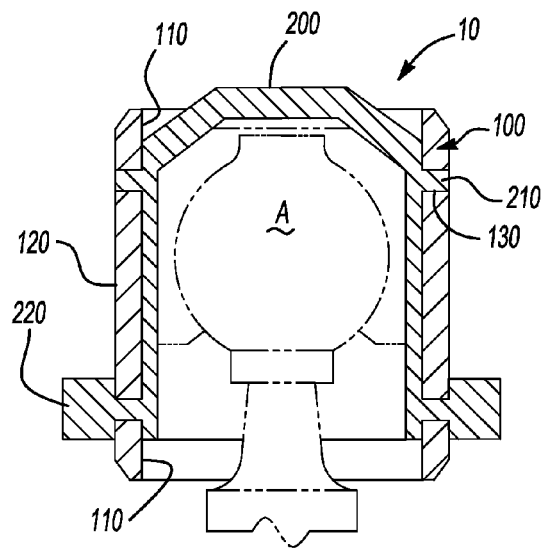
FIG. 2 is a cross-sectional view of an article produced using an embodiment of the method of the present invention.
Figure 3:
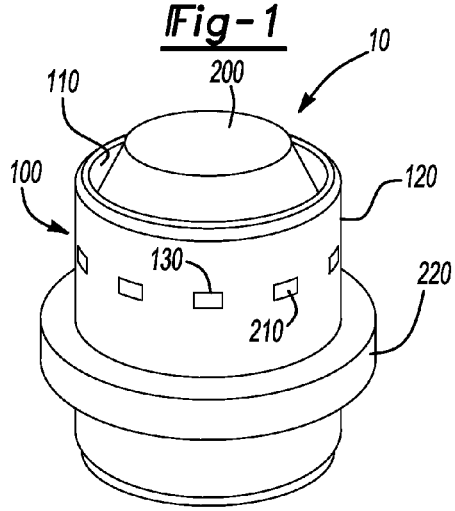
FIG. 3 is a perspective view of an article produced using an embodiment of the method of the present invention.

A cross-section of a first embodiment 10 produced using the method of the present invention is illustrated in FIG. 2. Onto the first layer 100, and at least partially through the apertures 130, a cast second layer 200 has been provided. The term cast, cast material, cast layer and/or casting is defined as a solid material, layer, article, etc. that has been formed from by the solidification of a liquid and not processed in such a way that recrystallization has occurred. The second layer 200 has region 210 which at least partially fills the apertures 130 of the first layer 100. In addition, a region 220 can be provided wherein the second layer 200 extends beyond the outer surface 120 of the first layer 100. A perspective view of the first embodiment 10 is shown in FIG. 3. The second layer 200 is a cast layer and includes a material with a melting point which is lower than the melting point of the first layer 100. For the purposes of the present invention, melting point is defined as a thermal property and represents that temperature at which a material begins transformation from a solid state to a liquid state upon heating from a temperature below the melting point of the material.

In addition to a lower melting temperature than the first layer 100, in one embodiment the second layer 200 has at least one physical, chemical and/or mechanical property that is less than or greater than the same property of the first layer by more than 20%. In a different embodiment, the second layer has at least one physical, chemical and/or mechanical property that is less than or greater than the same property of the first layer by more than 40%. And in a different embodiment, the second layer has at least one physical, chemical and/or mechanical property that is less than or greater than the same property of the first layer by more than 50%.

When the first layer 100 is made from a wrought material, it can be formed into a desired shape using any process known to those skilled in the art for forming wrought alloys illustratively including hot rolling, cold rolling, stamping, drawing, spin forming, pilgering, swaging machining, shearing, extruding and combinations thereof. Although the first layer 100 as illustrated in FIG. 1 is in the form of a tube, this is not required for the method of the present invention to be operable. For example, the first layer 100 can be in the form of a plate, sheet, rod and/or wire and any component made therefrom.

The first embodiment 10 shown in FIGS. 1-3 affords for a ball joint socket A to be press fit into the component as shown in phantom in FIG. 2. The second layer 200 provides a material that can meet a desired physical, chemical and/or mechanical property. For example, and in no way limiting the scope of the present invention, the first layer 100 can be made from a steel alloy that provides desirable strength but is difficult to machine when compared to an aluminum, magnesium and/or zinc alloy. However, an aluminum, magnesium or zinc alloy may not have the desired strength for the article to function as a ball joint socket A. Therefore, by providing a first layer 100 made from steel and casting a second layer 200 made from an aluminum, magnesium and/or zinc alloy thereon, a combination of properties from the steel and the aluminum, magnesium and/or zinc alloy is afforded. In this manner, an article made from a multilayered duplex material is provided with improved properties. Such an article can also reduce the cost of manufacture.

Figure 4:
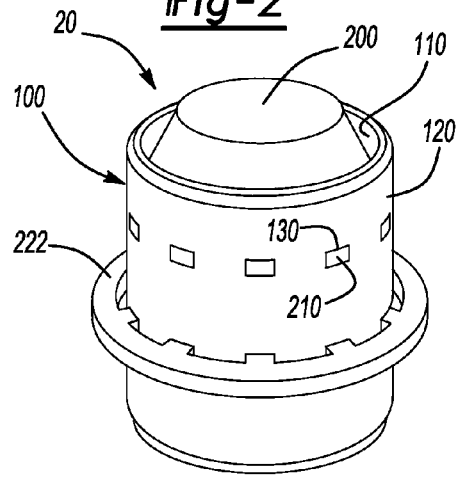
FIG. 4 is a perspective view of an article produced using an embodiment of the method of the present invention.

An article 20 made from a different embodiment of the method of the present invention is shown in FIG. 4. In this embodiment a second layer 200 is cast onto the first layer 100 but region 220 extending beyond the outer surface 120 is replaced by a region 222. The region 220 and/or 222 can provide the function of a spacer to the component 10 and/or 20. In addition, although the first embodiment 10 and second embodiment 20 illustrate the casting of the second layer 200 onto the inner surface 110 of the first layer 100, the second layer 200 can be cast on the outer surface 120, or on the inner surface 110 and the outer surface 120.

Figure 5:
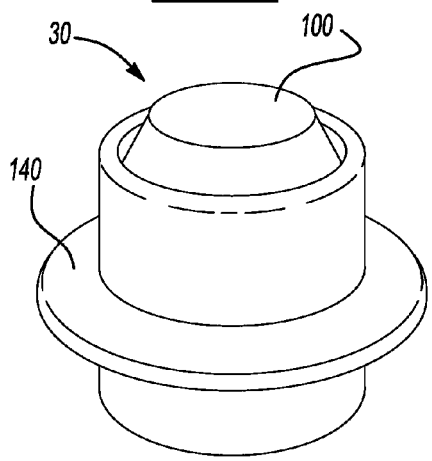
FIG. 5 is a perspective view of an example first layer used in an embodiment of the method of the present invention.
Figure 6:
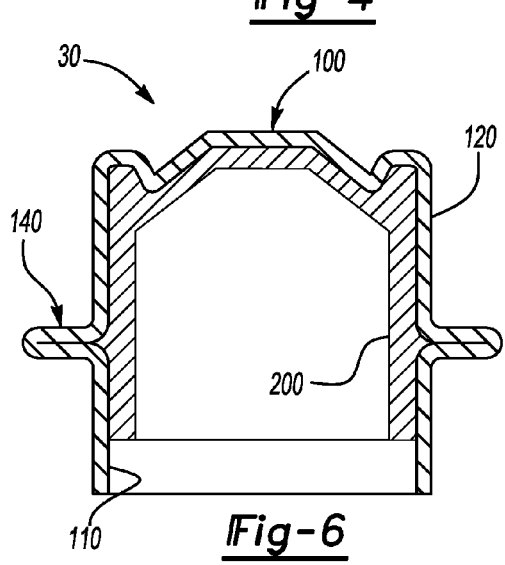
FIG. 6 is a cross-sectional view of an article produced using an embodiment of the method of the present invention.

Turning to FIG. 5, a first layer 100 with a different shape is illustrated. The first layer 100 does not have apertures 130 but does include regions 140 which can be formed using one or more of the wrought alloy forming processes mentioned above. As with apertures 130, the regions 140 can provide improved bonding between the first layer 100 and second layer 200.

Turning to FIGS. 7-10, an article 40 produced using a different embodiment of the method of the present invention is illustrated. In FIG. 7, an exploded view of an unassembled first layer 150 made from components 152, 154 and 156 is shown. The components can be assembled in any manner known to those skilled in the art, illustratively including welding as shown at location 153 in FIG. 8 and/or the use of adhesives, fasteners and the like. The component 154 can include apertures 155, however apertures are not required.

FIG. 9 illustrates the assembled first layer 150 positioned within an injection casting die A. After the first layer 150 is placed within the die A, the second layer can be injection cast onto and throughout the first layer 150. A second layer 230 is shown to cover an outer surface of component 156, and at least part of an inner surface and outer surface of component 152. A perspective view of the article 40 is shown in FIG. 10. The apertures 155 have been filled and the outer surface of the first layer 150 is covered with the second layer 230. Optionally, flanges 234 and 236 can be formed as part of the second layer 230. The component 152 with the second layer 230 can illustratively be used as a socket for a ball joint and the components 156 with second layer 230 can be used to mount to, for example, a suspension system. This embodiment illustrates the versatility of the method of the present invention to manufacture relatively complex shaped articles.

Turning to FIG. 11, a first layer 160 including a functional component such as a bracket 162 is shown. One embodiment of the method of the present invention can be used to provide a second layer 240 onto the first layer as shown in FIG. 12. The second layer 240 is provided on at least part of the inner surface 164 and outer surface 166 of the component 160 and at least partially fills the apertures 168. The filling of the apertures 168 with the second layer 240 can afford an aperture 168 with material that has different properties than the material comprising the first layer 100. For example, and for illustratively purposes only, the second layer 240 material can afford self-tapping with a threaded screw or improved machining properties such that threads can be produced at less cost.

An example article 60 produced using a different embodiment of the present invention is illustrated in FIGS. 13-15. In this embodiment, a first layer 170 is used to cast a second layer 250 and 252 thereon. In contrast to the functional component such as a bracket being formed from the first layer 170, the bracket 252 is formed using the second layer 250.

As illustrated in these figures and embodiments, the present method can be used to provide or manufacture a variety of multilayered duplex material articles. It is important to note that the second layer does not have to be a metallic material, for example it can be a plastic material.

The foregoing drawings, discussion and description are illustrative of specific embodiments of the present invention, but they are not meant to be limitations upon the practice thereof. Numerous modifications and variations of the method will be readily apparent to those of skill in the art in view of the teaching presented herein. It is the following claims, including all equivalents, which define the scope of the invention.

The invention claimed is:

1. A process for manufacturing a multilayered duplex material article comprising:
   providing a first layer from a non-cast material; and
   casting a second layer onto the first layer, the second layer comprising a material with a lower melting temperature than the first layer, for the purpose of manufacturing a multilayered duplex article;
   wherein the second layer has at least one property that is less than or greater than the same property of the first layer by more than 20%, the property selected from the group consisting of physical properties, chemical properties and mechanical properties.

2. A process according to claim 1, wherein the first layer is a wrought alloy.

3. A process according to claim 2, wherein the first layer is made from steel.

4. A process according to claim 1, wherein the first layer has apertures within, for the purpose of improving the bonding between the first layer and the second layer.

5. A process according to claim 1, wherein the second layer has at least one property that is less than or greater than the same property of the first layer by more than 40%, the property selected from the group consisting of physical properties, chemical properties and mechanical properties.

6. A process according to claim 1, wherein the second layer has at least one property that is less than or greater than the same property of the first layer by more than 50%, the property selected from the group consisting of physical properties, chemical properties and mechanical properties.

7. A process according to claim 1, wherein the second layer is providing a spacer to the article.

8. A process according to claim 1, wherein the second layer is providing a socket to the article.

9. A process according to claim 1, wherein the second layer is providing a surface appearance different than the first layer to the article.

10. A process according to claim 1, wherein the second layer is providing a surface to the article for bonding to a third layer.

11. A process according to claim 1, wherein the second layer is providing a material for welding.

12. A process according to claim 1, wherein the second layer is providing a material for machining.

13. A process according to claim 1, wherein the second layer is providing a bracket extending from the first layer.

14. A process according to claim 1, wherein the second layer is formed by sand casting.

15. A process according to claim 1, wherein the second layer is formed by injection die casting.

16. A process according to claim 1, wherein the second layer is an alloy.

17. A process according to claim 1, wherein the second layer is a plastic.

18. A process for manufacturing a multilayered duplex material article comprising:
   providing a first layer from a wrought steel alloy; and
   injection die casting a second layer onto the first layer, the second layer made from a material with a lower melting temperature than the first layer;
   the second layer material selected from the group consisting of alloys and plastics, for the purpose of manufacturing a multilayered duplex article;
   wherein the second layer has at least one property that is less than or greater than the same property of the first layer by more than 20%, the property selected from the group consisting of physical properties, chemical properties and mechanical properties.

* * * * *